(12) United States Patent
Hyatt

(10) Patent No.: US 8,030,890 B2
(45) Date of Patent: Oct. 4, 2011

(54) AUTOMATIC DISCONNECT OF AN AC SOURCE FROM A CONVERTER

(75) Inventor: Edward C. Hyatt, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 749 days.

(21) Appl. No.: 12/031,949

(22) Filed: Feb. 15, 2008

(65) Prior Publication Data
US 2009/0206792 A1 Aug. 20, 2009

(51) Int. Cl.
H02J 7/00 (2006.01)
H02J 7/04 (2006.01)
(52) U.S. Cl. .................. 320/114; 320/103; 320/140
(58) Field of Classification Search .................. 320/114, 320/103
See application file for complete search history.

(56) References Cited

U.S. PATENT DOCUMENTS

| | | | |
|---|---|---|---|
| 5,723,970 A * | 3/1998 | Bell | 320/140 |
| 6,339,314 B1 | 1/2002 | Bruning | |
| 6,509,658 B1 * | 1/2003 | Kim | 307/117 |
| 7,737,581 B2 * | 6/2010 | Spurlin et al. | 307/66 |
| 2005/0099750 A1 * | 5/2005 | Takahashi et al. | 361/92 |
| 2005/0168189 A1 | 8/2005 | Schweigert | |
| 2006/0152191 A1 | 7/2006 | Lee et al. | |
| 2007/0000138 A1 * | 1/2007 | Baskar et al. | 30/392 |

FOREIGN PATENT DOCUMENTS

| | | |
|---|---|---|
| EP | 1225675 | 7/2004 |
| EP | 1643610 | 4/2006 |
| GB | 2443455 | 5/2008 |

OTHER PUBLICATIONS

International Search Report, corresponding to International Patent Application No. PCT/US2008/075796, dated Jan. 26, 2009.
Written Opinion, corresponding to International Patent Application No. PCT/US2008/075796, dated Jan. 26, 2009.
Nokia, "Nokia becomes the first phone maker to add energy saving alerts to mobiles." www.nokia.com/A4136001?newsid=1125979, May 12, 2008.
International Preliminary Report and Patentability, corresponding to International Patent Application No. PCT/US2008/075796, dated May 3, 2010.

* cited by examiner

*Primary Examiner* — M'Baye Diao
(74) *Attorney, Agent, or Firm* — R. Brian Drozd; Moore & Van Allen

(57) ABSTRACT

A system for automatic disconnect of an AC source from a converter that includes a converter and a converter. The converter includes a power supply capable of being connected to an alternating current (AC) power source and converting an AC voltage to a direct current (DC) voltage. The portable device contains a rechargeable battery where the portable device uses the DC voltage to charge the rechargeable battery. The connection of the converter to the AC power source is automatically disconnected responsive to the rechargeable battery reaching a full charge or the portable device being disconnected from the converter and automatically reconnected responsive to the rechargeable battery being below a full charge or the portable device being reconnected to the converter.

23 Claims, 4 Drawing Sheets

AUTOMATIC DISCONNECT OF AN AC SOURCE FROM A CONVERTER

BACKGROUND OF THE INVENTION

The present invention is related to converters, and more specifically to automatic disconnect of an alternating current (AC) source from a converter.

Due to cost and demand, efforts are constantly being made to conserve on the use of energy. This applies even to electricity used when a charging device is still connected to an AC source but the device being charged has been disconnected or is fully charged. Although a device may be disconnected from the charging device or fully charged, due to electronics today, the charging device may still be drawing power and burning energy. A charging device, such as a wall wart, receives AC power and includes a DC charging power supply with a DC converter and an isolation device between the AC source and the DC charging power supply where the DC charging power supply rectifies and steps down the AC power source to produce a suitable DC charging source usable for charging a rechargeable battery on a device. For example, existing phone chargers used to charge cell phones may use a transformer or switching converter that remains powered by the AC supply even when the phone is fully charged and no longer drawing a direct current (DC) charging current. This causes an energy consumption that adds to increased energy costs. This cost is further increased if one or more other devices are drawing unnecessary power. In many cases, a person is unaware of this unnecessary energy use.

BRIEF SUMMARY OF THE INVENTION

According to one aspect of the present invention, a system for automatic AC disconnect of a converter includes a converter, the converter including a power supply capable of being connected to an alternating current (AC) power source and converting an AC voltage to a direct current (DC) voltage, and a portable device, the portable device containing a rechargeable battery, the portable device using the DC voltage to charge the rechargeable battery, wherein the connection of the converter to the AC power source is automatically disconnected responsive to the rechargeable battery reaching a full charge or the portable device being disconnected from the converter.

According to another aspect of the present invention, a portable device includes a rechargeable battery, and a controller, the controller capable of monitoring a charge level of the rechargeable battery and sending a signal to a converter when the rechargeable battery reaches a full charge, wherein the signal is useable at the converter for automatically disconnecting the converter from an AC power source when the rechargeable battery reaches a full charge and automatically reconnecting the converter to the AC power source when the rechargeable battery is below a full charge or the portable device is reconnected to the converter.

According to still a further aspect of the present invention, a converter device includes a power supply, the power supply capable of being connected to an alternating current (AC) power source and converting an AC voltage to a direct current (DC) voltage, and disconnect circuitry, the disconnect circuitry capable of receiving a signal from a portable device and automatically disconnecting the converter device from the AC power source responsive to the received signal and automatically reconnecting the converter device to the AC power source responsive to the received signal.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

According to embodiments of the present invention, a charging device may be equipped with a sensor (e.g., current sensor) to detect when a device is no longer pulling charge current and when a battery has been fully charged by the charger. Once this condition is detected, the converter or charger may be automatically disconnected from the AC supply. To help illustrate embodiments of the present invention, a wall wart may be used as the converter or charger, and the device having a battery to be charged may be a cellular phone. However, embodiments of the present invention are not limited by the use of a wall wart and a cellular phone as any type charger and any type device needing to be charged may be included and implemented according to embodiments of the present invention.

According to embodiments of the present invention, a switching device in a wall wart may be connected in series with an AC supply and automatically controlled to disconnect the wall wart from the AC supply. The automatic disconnect may occur once a battery has reached a full charge or if the device with the battery being charged has been disconnected from the wall wart. The switching device in the wall wart may be automatically controlled by the device connected to the wall wart or controlled by the wall wart. The device connected to the wall wart may also be referred to as the device to be charged.

Figure 1:
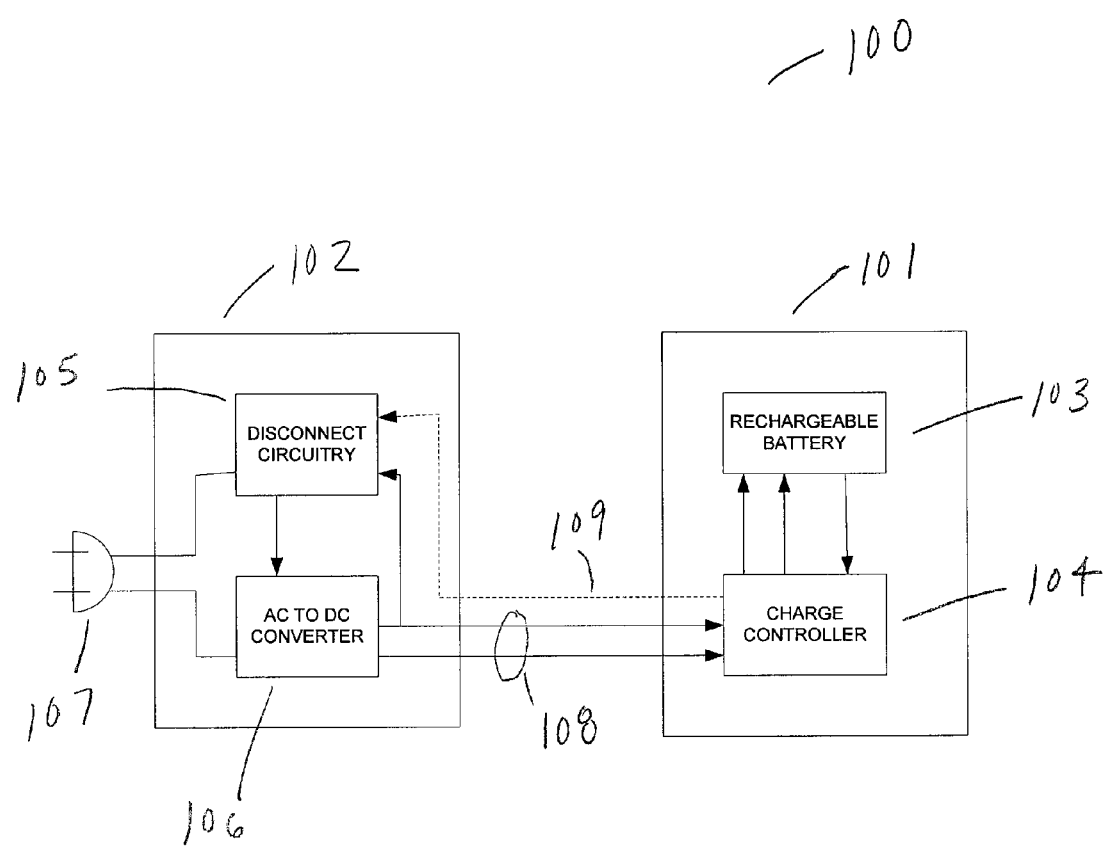
FIG. 1 is a diagram of a system for automatic disconnect of an AC source from a converter according to an example embodiment of the present invention.

FIG. 1 shows a diagram of a system for automatic disconnect of an AC source from a converter according to an example embodiment of the present invention. The system 100 may include a device 101 that may be interconnected to a converter 102. The device 101 and the converter 102 may be interconnected via a cable containing a polarized wire pair 108 that feeds into a charge controller 104 on the device 101. The charge controller 104 may control charging of a rechargeable battery 103 on the device 101. The polarized pair 108 provides a DC voltage that is used to charge the rechargeable battery 101. The polarized pair 108 may be generated from an AC to DC converter 106 on the converter 102. The AC to DC converter 106 may receive AC power for an AC source via a connector 107. The converter 102 may also include disconnect circuitry 105 that may be controlled by the device 101 or by the converter 102 to automatically disconnect the AC to DC converter 106 from the connector 107 and thus the AC source when the rechargeable battery 103 has reached a full charge or when the device 101 has been disconnected from the converter 102. The disconnect circuitry 105 may also be controlled by the device 101 or by the converter 102 to automatically reconnect the AC to DC converter 106 to the connector 107 and thus the AC source when the rechargeable battery 103 is below a full charge or when the device 101 has been reconnected to the converter 102. In some embodiments where the device 101 controls the automatic disconnecting from the AC source, a signal 109 may be fed from the device 101 to the disconnect circuitry 105 on the converter 102. The device 101 may be any type of device with a rechargeable battery or device that requires recharging. Further, the converter 102, may be any type of device used to charge another device.

Figure 2:
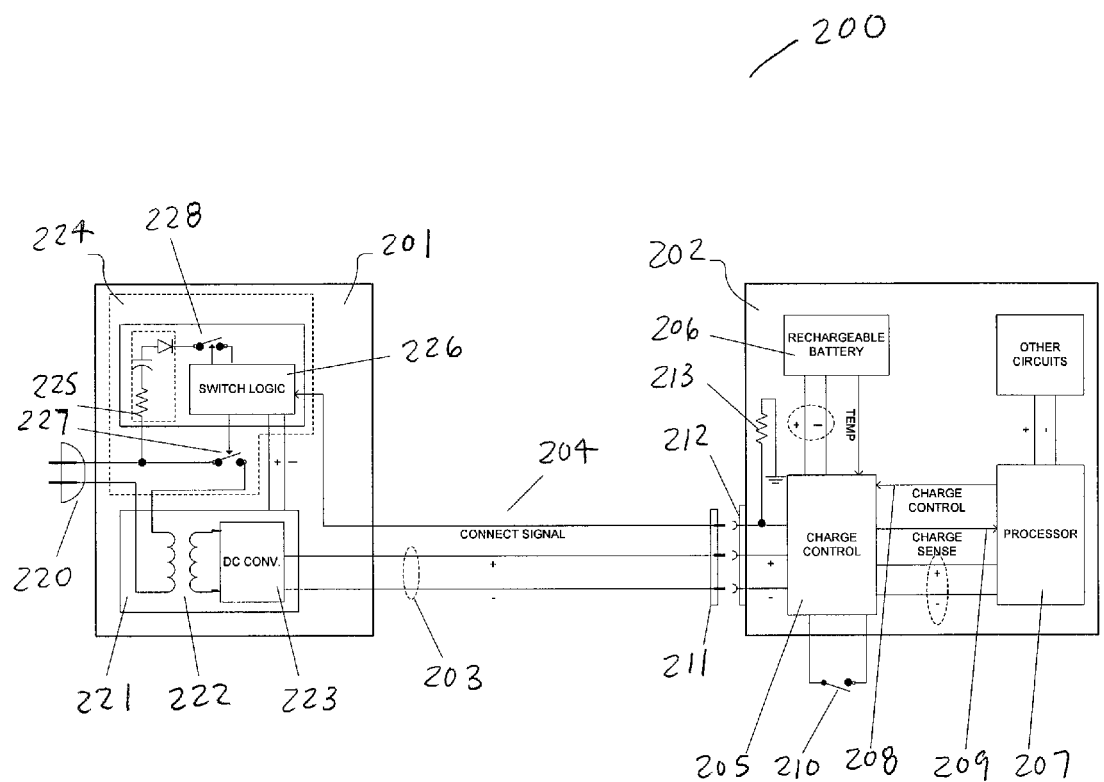
FIG. 2 is a diagram of a system for automatic disconnect of an AC source from a converter according to another example embodiment of the present invention.

FIG. 2 shows a diagram of a system for automatic disconnect of an AC source from a converter according to another example embodiment of the present invention. The system 200 may include a wall wart 201 interconnected to a device 202 via a cable that includes a polarized wire pair 203. The cable with the polarized wire pair 203 may include a connector 211 that mates with a second connecter 212 on the device 202. A connect signal 204 may also be included in the connecter 211 and the connecter 212. The connect signal 204 may be fed from the device 202 to the wall wart 201 to automatically disconnect the wall wart 201 from an AC power source.

The device 202 may include a charge controller 205 that feeds a voltage from the polarized pair 203 received from the wall wart 201 via the cable to a rechargeable battery 206. The device 202 may also include a processor 207 that may receive a charge sense signal 209 from the charge controller 205 and provide a charge control signal 208 to the charge controller 205. The charge controller 205 may also monitor a temperature of the rechargeable battery 206. The processor 207 may also control and/or monitor other circuits on the device 202.

The wall wart 201 may include a connect controller 224 that contains a low voltage DC bootstrap supply 225, a second switching device 228, and switch logic 226. When connector 211 is attached to device 202 via connector 212, a resister 213 in device 202 may provide a path for the low voltage DC bootstrap supply 225 to power switch logic 226. The switch logic 226 in wall wart 201 may control a first switching device 227 to connect or disconnect the connector 220 to the AC power source coming into the wall wart 201 as directed by the connect signal 204 received from the device 202. This eliminates any leakage current while device 202 is not being actively charged. When the switch logic 226 is powered on, the switch logic 226 may close a first switching device 227 to connect a DC charging power supply 221 in wall wart 201 to the connector 220 and the AC power source thereby starting up a DC charging power supply 221 and powering both the switch logic 226 as well as the device 202 from the DC charging power supply 221. Once bootstrapped, the switch logic 226 may then open a second switch 228 and then derive its power from the DC charging power supply 221. For safely considerations, the connect controller 224 may be electrically isolated from the DC charging power supply 221. DC charging power supply 221 may include a transformer 222 connected between one wire of the connector 220 and the first switching device 227. The other winding of the transformer 222 may be connected to a DC converter 223 that provides the polarized signals 203 to the device 202 via the cable to be used to charge the rechargeable battery 206.

When a device 202 is initially connected to wall wart 201, it may connect in a charging mode. However, once the device 202 has been detected that the rechargeable battery is fully charged, the device 202 may drive the connect signal 204 to a level causing the switch logic 226 to open the first switch 227 to disconnect the connector 220 from the AC power source. Moreover, if the connector 211 on the cable providing the polarized pair 203 is detached from the device 202, this may cause the connect signal 204 line to float to a "high" level as it is no longer being pulled down by the resister 213 in device 202. This may cause the switch logic 226 to control the first switch 227 to disconnect the connector 220 from the AC power source. A manual override switch 210 connected to the charge controller 205 of device 202 may force the device 202 to request charging, however, if the rechargeable battery 206 is fully charged or if there are other conditions preventing charging, then activation of the switch 210.

Figure 3:
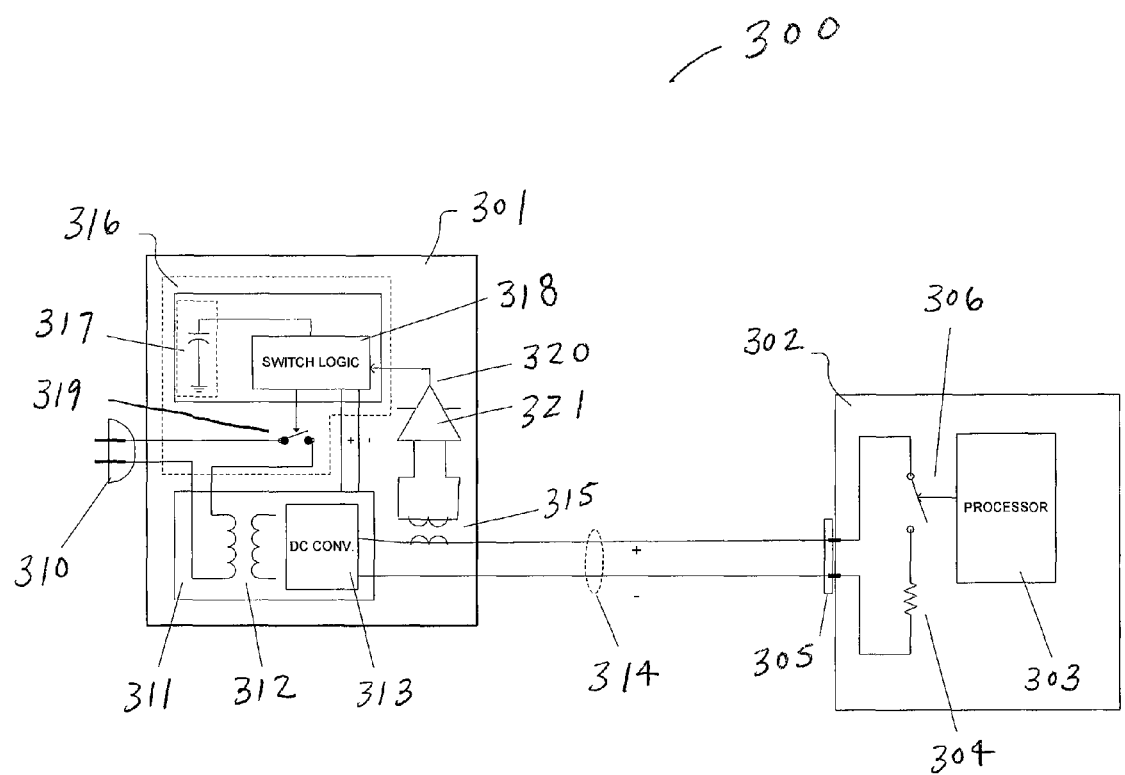
FIG. 3 is a diagram of a system for automatic disconnect of AC from a converter according to still another example embodiment of the present invention.

FIG. 3 shows a diagram of a system for automatic disconnect of AC from a converter according to still another example embodiment of the present invention. The system 300 may include a device 302 and a charging device 301. The device 302 may include a rechargeable battery (not shown). In this example embodiment, the device 302 may not provide a connect signal to the charging device 301 to automatically disconnect the charging device from an AC source. In this example embodiment, a positive supply lead of a polarized wire pair 314 may be used for signaling a charged state. For example, a processor 303 in the device 302 may control a switch 306 to pulse thereby connecting a resister 304 across the polarized wire pair 314. This may induce current pulses in the positive supply lead of the polarized wire pair 314 that may be received by a coil 315 and a current sensed by the op-amp 321 at the charging device 301. The current pulses detected by the coil 315 and the op-amp 321 may be cause the generation of a connect signal 320 by the op-amp 321 that may be fed to switch logic 318. The switch logic 318 may decode and validate the current pulse series to distinguish valid "charge on" (i.e., connect to AC source) and "charge off" (i.e., disconnect from AC source) states from normal noise. Similar to other embodiments, the connect signal 320 may be used to cause switch logic 318 to open a switching device 319 in charging device 301 to disconnect a connector 310 from an AC power source. The switch logic 318 may be included in a controller 316 where the controller may also include a "super capacitor" circuit 317 that may store energy to power the switch logic 318 and the amplifier 321 during a bootstrap operation. As with previous embodiments, the charger device 301 may include a DC charging power supply 311 that includes a transformer 312 with one winding connected between the connector 310 and the switching device 319 and the other winding connected to a DC converter 313 that provides the polarized wire pair signals 314 to the device 302.

In another example embodiment of the present invention, the device 302 may not include the switching device 306 or the resister 304 and may not generate pulses to the charging device 301 via the polarized signals 314, but instead, the coil 315 may sense a current level remaining low or at zero suggesting that the device 302 has been disconnected from the charging device 301. Similarly, when a rechargeable battery at device 302 is fully charged, a current drain may be sensed by the current sensor to be at a low or zero level. In these cases when a current level or a current drain remains low or at zero, as noted previously, switch logic 318 may control the switching device 319 to disconnect the connector 310 from the AC power source via opening the switching device 319. When the device 302 is reconnected to charging device 301 or when battery charging of the rechargeable battery at device 302 resumes, the coil 315 and op-amp 321 may sense a current level rise above a specified minimum threshold. This may cause the amplifier 321 to generate a connect signal 320 that may then be fed into the switch logic 318 causing the switch logic 318 to close the switching device 319 and connect the charging device 301 to the AC power source. In this embodiment, the super capacitor circuit 317 in the controller 316 may store energy to power the switch logic 318 and operational amplifier 321 during a bootstrap operation.

Figure 4:
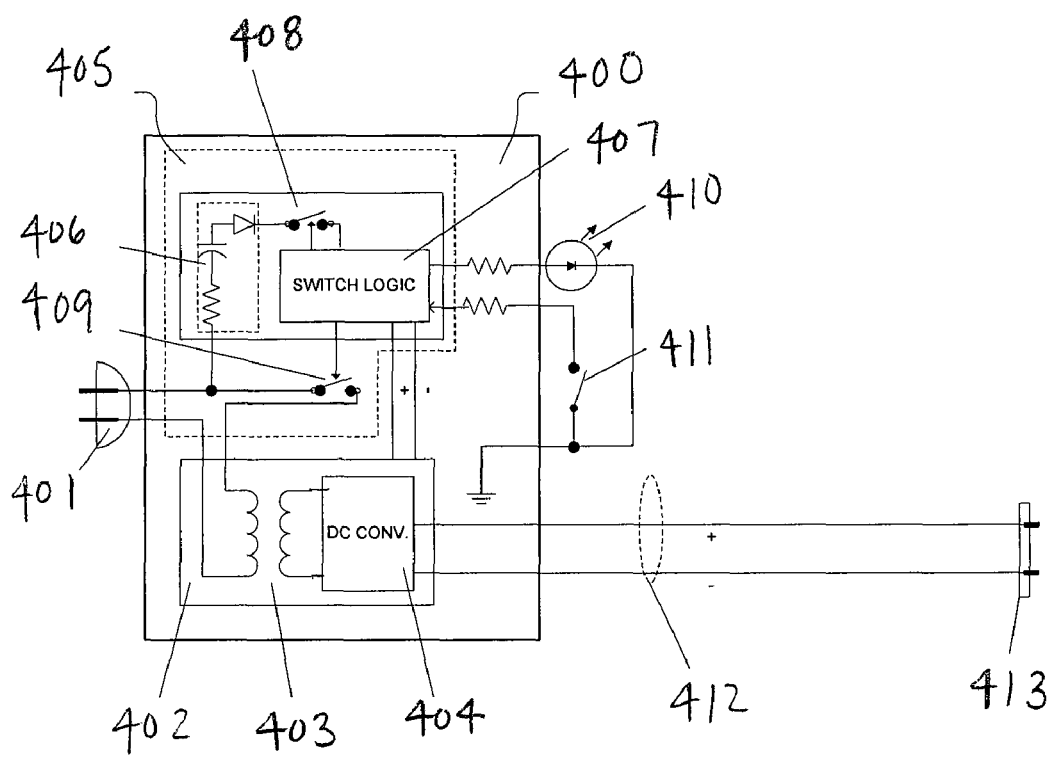
FIG. 4 is a diagram of a wall wart for automatic disconnect of an AC source from a converter according to an example embodiment of the present invention.

FIG. 4 shows a diagram of a wall wart for automatic disconnect of an AC source from a converter according to an example embodiment of the present invention. The wall wart may include a DC charging power supply 402 that includes a transformer 403 and a DC converter 404. The DC converter 404 provides polarized wire pair signals 412 via a connector 413 to a device requiring to be charged. The transformer 403 may have one winding connected between a first signal line of a connector 401, which receives signals from an AC power source, and one end of a first switching device 409. The other end of the first switching device 409 may be connected to a second signal line of the connector 401. The switching device 409 may be controlled to disconnect the connector 401 from the AC power source. The other winding of the transformer 403 may be connected to the DC converter 404. The wall wart 400 may also include a controller 405 that may include a low voltage DC bootstrap power supply 406 connected to a second switching device 408 that controlled by switch logic 407. Further, the wall wart 400 may include an external push button switch 411 that when depressed may start a charging cycle by causing the switch logic 407 to close the first switching device 409 connecting the wall wart 400 to the AC power source. When charging is active, a light emitting diode (LED) 410 may illuminate. When a current drain on the output of the DC charging power supply 402 is zero or below a specified threshold, charging may terminate. The switch logic 407 may open the first switching device 409 to disconnect the connector 401 from the AC power source, and the LED 410 light may be extinguished. The switch logic 407 may remain reset until the push button switch 411 is pressed again.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for automatic AC disconnect of a converter comprising:
a converter comprising a power supply capable of being connected to an alternating current (AC) power source and converting an AC voltage to a direct current (DC) voltage; and
a portable device comprising a rechargeable battery, the portable device using the DC voltage to charge the rechargeable battery, and the portable device generating a disconnect signal responsive to the rechargeable battery reaching a full charge,
wherein the connection of the portable device with the AC power source is triggered to be disconnected responsive to receiving the disconnect signal to indicate the rechargeable battery reaching a full charge.

2. The system according to claim 1, further comprising the disconnect signal triggering a switch in the converter to automatically disconnect the portable device from the AC power source.

3. The system according to claim 1, the converter including a bootstrap power supply, the bootstrap power supply being activated upon connection of the converter to the portable device.

4. The system according to claim 3, the bootstrap power supply being activated upon connection of the bootstrap power supply to circuitry in the portable device.

5. The system according to claim 3, the bootstrap power supply when activated providing power to a controller in the converter, the controller receiving the disconnect signal and controlling the disconnecting of the portable device from the AC power source.

6. The system according to claim 1, wherein the connection of the portable device to the AC power source is automatically reconnected responsive to the rechargeable battery being below a full charge or the portable device being reconnected to the converter.

7. The system according to claim 1, the converter further comprising a manual switch, the manual switch when activated causing the converter to connect to the AC power source.

8. A system for automatic AC disconnect of a converter comprising:
- a converter comprising a power supply capable of being connected to an alternating current (AC) power source and converting an AC voltage to a direct current (DC) voltage; and
- a portable device containing a rechargeable battery, the portable device using the DC voltage to charge the rechargeable battery,
- wherein the connection of the portable device with the AC power source is triggered to be disconnected responsive to the rechargeable battery reaching a full charge or the portable device being disconnected from the AC power source, and
- wherein the portable device generates current pulses on a power line between the portable device and the AC power source, the converter detecting the current pulses and disconnecting the portable device from the AC power source responsive to the detecting the current pulses.

9. The system according to claim 8, the converter further comprising a current sensor, the current sensor being capable of detecting the current pulses.

10. The system according to claim 9, the converter further comprising a super capacitor that provides power to a controller in the converter and the current sensor during bootstrap.

11. The system according to claim 8, wherein the connection of the portable device to the AC power source is automatically reconnected responsive to the rechargeable battery being below a full charge or the portable device being reconnected to the converter.

12. The system according to claim 8, wherein the converter further comprises a manual switch, the manual switch when activated causing the converter to connect to the AC power source.

13. A portable device comprising:
- a rechargeable battery;
- a controller capable of monitoring a charge level of the rechargeable battery and sending a signal to a converter, the controller sending a signal comprising current pulses over a power connection to the converter when the rechargeable battery reaches a full charge; and
- wherein the signal is useable at the converter for disconnecting the portable device from an AC power source when the rechargeable battery reaches a full charge and automatically reconnecting the portable device to the AC power source when the rechargeable battery is below a full charge.

14. The portable device according to claim 13, the controller sending a signal over a dedicated connection to the converter when the rechargeable battery reaches a full charge.

15. The portable device according to claim 13, the portable device further comprising circuitry activating a bootstrap power source on the converter when the portable device is connected to the converter.

16. A converter device comprising:
- a power supply, the power supply capable of being connected to an alternating current (AC) power source and converting an AC voltage to a direct current (DC) voltage;
- disconnect circuitry, the disconnect circuitry capable of receiving a signal from a portable device and automatically disconnecting the converter device from the AC power source responsive to the received signal or automatically reconnecting the converter device to the AC power source responsive to the received signal; and
- a bootstrap power source, the bootstrap power source being activated upon connection of the converter to the portable device.

17. The converter according to claim 16, the bootstrap power supply when activated providing power to the disconnect circuitry, the disconnect circuitry receiving the signal from the portable device and controlling the disconnecting of the converter from the AC power source.

18. The converter according to claim 16, wherein the converter comprises a wall wart.

19. A system for automatic AC disconnect of a converter comprising:
- a converter comprising a power supply capable of being connected to an alternating current (AC) power source and converting an AC voltage to a direct current (DC) voltage; and
- a portable device containing a rechargeable battery, the portable device using the DC voltage to charge the rechargeable battery,
- wherein the connection of the portable device to the AC power source is triggered to be disconnected responsive to the rechargeable battery reaching a full charge or the portable device being disconnected from the AC power source, and
- wherein the connection of the portable device to the AC power source is triggered to be reconnected responsive to the rechargeable battery being below a full charge or the portable device being reconnected to the AC power source.

20. A system for automatic AC disconnect of a converter comprising:
- a converter comprising a power supply capable of being connected to an alternating current (AC) power source and converting an AC voltage to a direct current (DC) voltage;
- a manual switch, the manual switch when activated causing the portable device to be connected with the AC power source; and
- a portable device containing a rechargeable battery, the portable device using the DC voltage to charge the rechargeable battery,
- wherein the connection of the converter to the AC power source is triggered to be disconnected responsive to the rechargeable battery reaching a full charge or the portable device being disconnected from the converter.

21. A system for automatic AC disconnect of a converter comprising:
- a converter comprising a current sensor and a power supply, the power supply capable of being connected to an alternating current (AC) power source and converting an AC voltage to a direct current (DC) voltage; and
- a portable device containing a rechargeable battery, the portable device using the DC voltage to charge the rechargeable battery,
- wherein the connection of the converter to the AC power source is triggered to be disconnected responsive to the rechargeable battery reaching a full charge or the portable device being disconnected from the converter, and wherein the converter disconnects the portable device from the AC power source responsive to the current sensor detecting a current on a power line between the portable device and the converter being below a defined level.

22. The system according to claim 21, wherein the connection of the portable device to the AC power source is automatically reconnected responsive to the rechargeable battery being below a full charge or the portable device being reconnected to the converter.

23. The system according to claim 21, wherein the converter further comprises a manual switch, the manual switch when activated causing the converter to connect to the AC power source.

* * * * *